(12) United States Patent
Shi et al.

(10) Patent No.: US 10,148,415 B2
(45) Date of Patent: Dec. 4, 2018

(54) ALIGNING THE UPSTREAM DMT SYMBOLS OF MULTIPLE LINES IN A TDD DSL SYSTEM

(71) Applicant: Futurewei Technologies, Inc., Plano, TX (US)

(72) Inventors: Cao Shi, Shenzhen (CN); Amir H. Fazlollahi, San Jose, CA (US); Jianhua Liu, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/066,947

(22) Filed: Mar. 10, 2016

(65) Prior Publication Data

US 2016/0191230 A1 Jun. 30, 2016

Related U.S. Application Data

(63) Continuation of application No. 13/875,447, filed on May 2, 2013, now Pat. No. 9,331,840.

(Continued)

(51) Int. Cl.
*H04L 7/00* (2006.01)
*H04B 3/32* (2006.01)
(Continued)

(52) U.S. Cl.
CPC .............. *H04L 7/0041* (2013.01); *H04B 3/32* (2013.01); *H04L 5/14* (2013.01); *H04L 25/14* (2013.01);
(Continued)

(58) Field of Classification Search
CPC ......... H04L 7/0041; H04L 5/14; H04L 25/14; H04L 5/1469; H04L 27/2646;
(Continued)

(56) References Cited

U.S. PATENT DOCUMENTS 6,031,882 A * 2/2000 Enge ...................... H04B 1/711
375/343
6,134,283 A 10/2000 Sands et al.
(Continued)

FOREIGN PATENT DOCUMENTS

WO 2004091249 A1 10/2004

OTHER PUBLICATIONS

"Gigabit-capable Passive Optical Networks (G-PON): Transmission convergence layer specification," Series G: Transmission Systems and Media, Digital Systems and Networks; Digital sections and digital line system—Optical line systems for local and access networks, ITU-T Telecommunication Standardization Sector of ITU, Mar. 2008, G.984.3, pp. 1-146.
(Continued)

*Primary Examiner* — Jae Y Lee
*Assistant Examiner* — Jean F Voltaire
(74) *Attorney, Agent, or Firm* — Conley Rose, P.C.

(57) ABSTRACT

Time-division duplex (TDD) transmission in a digital subscriber line (DSL) communication system including a group of DSL transceivers at a remote side (FTU-Rs) and a distribution point unit (DPU) by performing, with a second FTU-R among the group of FTU-Rs, an initial upstream symbol alignment for a first FTU-R, where a first gap time the first FTU-R needs to wait before transmitting first upstream symbols to a first DSL transceiver at an operator side (FTU-O) at the DPU in a TDD frame period is acquired to make the first upstream symbols align at the first FTU-O's interface, transmitting second upstream symbols to the first FTU-O to correct the first gap time after performing the initial upstream symbol alignment, receiving, from the first FTU-O, tuning offset information representing a correction for the first gap time, and tuning the first FTU-R's upstream
(Continued)

symbols transmit time according to the tuning offset information received.

16 Claims, 11 Drawing Sheets

Related U.S. Application Data

(60) Provisional application No. 61/641,424, filed on May 2, 2012, provisional application No. 61/772,312, filed on Mar. 4, 2013.

(51) Int. Cl.
| | | |
|---|---|---|
| *H04M 11/06* | (2006.01) | |
| *H04L 25/14* | (2006.01) | |
| *H04L 27/26* | (2006.01) | |
| *H04L 5/14* | (2006.01) | |
| *H04J 3/06* | (2006.01) | |

(52) U.S. Cl.
CPC ...... *H04L 27/2646* (2013.01); *H04L 27/2662* (2013.01); *H04M 11/062* (2013.01); *H04J 3/0682* (2013.01); *H04L 5/1469* (2013.01)

(58) Field of Classification Search
CPC ............. H04L 27/2662; H04L 27/2602; H04L 5/0007; H04L 9/00; H04L 12/28; H04B 7/2656; H04B 7/2603
USPC ........................................................ 370/294
See application file for complete search history.

(56) References Cited

U.S. PATENT DOCUMENTS

| 8,582,425 | B1 | 11/2013 | Turner et al. | |
|---|---|---|---|---|
| 2005/0232308 | A1* | 10/2005 | Redfern | H04J 3/0682 370/503 |
| 2005/0237954 | A1* | 10/2005 | Hasegawa | H04B 3/02 370/292 |
| 2005/0286620 | A1* | 12/2005 | Peng | H04L 5/14 375/222 |
| 2009/0296865 | A1 | 12/2009 | Ashikhmin et al. | |
| 2013/0294298 | A1* | 11/2013 | Chang | H04L 27/2602 370/280 |
| 2013/0310074 | A1 | 11/2013 | Porzio | |
| 2014/0161000 | A1* | 6/2014 | Fazlollahi | H04B 3/32 370/280 |

OTHER PUBLICATIONS

"Very high speed digital subscriber line transceivers 2 (VDSL2)," Series G: Transmission Systems and Media, Digital Systems and Networks; Digital sections and digital line system—Access networks, ITU-T Telecommunication Standardization Sector of ITU, Dec. 2011, G.993.2, pp. 1-376.

"Updated draft text for G.fast—version 3.0," ITU—Telecommunication Standardization Sector, Study Group 15, Chengdu, China, Nov. 5-9, 2012, 2012-11-4A-R20, pp. 1-38.

Foreign Communication From a Counterpart Application, PCT Application No. PCT/US2013/039207, International Search Report dated Jul. 26, 2013, 4 pages.

Foreign Communication From a Counterpart Application, PCT Application No. PCT/US2013/039207, Written Opinion dated Jul. 26, 2013, 7 pages.

Office Action dated Aug. 28, 2014, 6 pages, U.S. Appl. No. 13/875,447, filed May 2, 2013.

Office Action dated Sep. 21, 2015, 12 pages, U.S. Appl. No. 13/875,447, filed May 2, 2013.

Office Action dated Feb. 27, 2015, 24 pages, U.S. Appl. No. 13/875,447, filed May 2, 2013.

Notice of Allowance dated Dec. 8, 2015, 9 pages, U.S. Appl. No. 13/875,447, filed May 2, 2013.

\* cited by examiner

ALIGNING THE UPSTREAM DMT SYMBOLS OF MULTIPLE LINES IN A TDD DSL SYSTEM

CROSS-REFERENCE TO RELATED APPLICATIONS

The present application is a continuation application of U.S. Non-Provisional application Ser. No. 13/875,447 filed on May 2, 2013, entitled "Aligning the Upstream DMT Symbols of Multiple Lines in a TDD DSL System," which claims benefit of U.S. Provisional Patent Application No. 61/641,424 filed May 2, 2012, by Cao Shi, et al. and entitled "A Method to Align the Upstream DMT Symbols of Multiple Lines in a TDD DSL System" and U.S. Provisional Patent Application No. 61/772,312 filed Mar. 4, 2013, by Cao Shi, et al., and entitled "A Method to Align the Upstream DMT Symbols of Multiple Lines in a TDD DSL System—2," which are incorporated herein by reference as if reproduced in their entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Digital subscriber line (DSL) technologies are utilized to supply high speed data over twisted pair conductors. Current DSL standards may comprise asymmetric DSL (ADSL, ADSL2 and ADSL2+), very-high-bit-rate DSL (VDSL and VDSL2), and integrated services digital network (ISDN). These technologies may use baseband transmission in conjunction with plain old telephone service (POTS). DSL signals may occupy higher frequency bands while the POTS signals may be transmitted over frequency bands below 4 kilohertz (KHz). The DSL and POTS signals may be split and coupled through a splitter to the corresponding receiver and network, respectively.

Discrete multi-tone modulation (DMT) may be implemented in DSL systems. DSL access multiplexer (DSLAM) equipment may offer multi-port access and support to different DSL technologies. ADSL/ADSL2 and VDSL2 standards may employ frequency division duplexing (FDD), in which downstream (DS) and upstream (US) transmission occurs simultaneously at two different frequency bands. However, these standards may suffer from issues with near-end crosstalk (NEXT) and echo during transmission.

Alternatively, time-division duplex (TDD) systems may be utilized, in which US and DS transmissions may occur in different time intervals. DS signals of different lines may be transmitted at the same time since all the transceiver units are all located and controlled at the central office side. However, US signals may be transmitted at varying times and should be aligned properly to facilitate crosstalk elimination at central office or operator-side transceivers. Timing offsets between various signals arriving from the customer premises may detrimentally affect crosstalk cancellation. Thus, there is a need to improve the alignment of US symbols as seen at operator-side equipment in order to enhance crosstalk cancellation.

SUMMARY

In one embodiment, the disclosure includes a method for time-division duplex (TDD) transmission in a digital subscriber line (DSL) communication system including a group of DSL transceivers at a remote side (FTU-Rs) and a distribution point unit (DPU) including performing, with a second FTU-R among the group of FTU-Rs, an initial upstream symbol alignment for a first FTU-R where a first gap time that the first FTU-R needs to wait before transmitting first upstream symbols to a first DSL transceiver at an operator side (FTU-O) at the DPU in a TDD frame period is acquired to make the first upstream symbols align at the first FTU-O's interface, transmitting second upstream symbols to the first FTU-O to correct the first gap time after performing the initial upstream symbol alignment, receiving, from the first FTU-O, tuning offset information representing a correction for the first gap time, and tuning the first FTU-R's upstream symbols transmit time according to the tuning offset information received.

In another embodiment, the disclosure includes apparatus for a time-division duplex (TDD) transmission in a digital subscriber line (DSL) transceiver at remote side (FTU-R) having a memory storage comprising instructions and one or more processors coupled to the memory that execute the instructions to enable the FTU-R to perform an initial upstream symbol alignment with a second FTU-R that supports TDD transmission with a first gap time that the FTU-R needs to wait before transmitting first upstream symbols to a first DSL transceiver at an operator side (FTU-O) in a TDD frame period acquired to make the first upstream symbols align at the first FTU-O's interface, transmit second upstream symbols to the first FTU-O to correct the first gap time after performing the initial upstream symbol alignment, receive, from the first FTU-O, tuning offset information that represents a correction for the first gap time, and tune the FTU-R's upstream symbols transmit time according to the tuning offset information.

In yet another embodiment, the disclosure includes distribution point unit (DPU) including a plurality of digital subscriber line (DSL) transceivers that support time-division duplex (TDD) transmissions with respective DSL transceivers at remote side (FTU-Rs), and a processor coupled to the DSL transceivers and configured to perform an initial upstream symbol alignment for a first FTU-R coupled to a first DSL transceiver among the plurality of DSL transceivers with a second FTU-R coupled to a second DSL transceiver among the plurality of DSL transceivers, wherein a first gap time that the first FTU-R needs to wait before transmitting first upstream symbols to the first DSL transceiver in a TDD frame period is acquired to make the first upstream symbols align at the first DSL transceiver's interface, estimate a correction for the first gap time to be used by the first FTU-R to tune upstream symbols transmit time in response to reception of second upstream symbols for correcting the first gap time from the first FTU-R, and transmit, to the first FTU-R, tuning offset information that represents a correction for the first gap time.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Depending on the supported standard, a DSL system may be denoted as an xDSL system where 'x' may indicate any DSL standard. For instance, 'x' may stand for 'A' in ADSL2 or ADSL2+ systems, 'V' in VDSL or VDSL2 systems, or 'F' in G.fast systems. When a transceiver is located at an operator end of the DSL system, including a central office (CO), DSL access multiplexer (DSLAM), cabinet, or a distribution point unit (DPU), the transceiver may be referred to as an xTU-O. On the other hand, when a transceiver is located at a remote or user end such as a customer premise equipment (CPE), the transceiver may be referred to as an xTU-R. For example, if the DSL system is a G.fast system, a transceiver at an operator side may be referred to as a G.fast transceiver unit at an operator side (FTU-O). Similarly, in the G.fast system, a CPE transceiver may be referred to as a FTU at a remote terminal (FTU-R), i.e., at a subscriber side. G.fast is a most recently started ITU-T SG15-Q4 DSL standard and is in progress.

For convenience, the application is written primarily using notation from G.fast, but as a person of ordinary skill in the art will recognize, the techniques disclosed herein apply to any TDD DSL system. For example, while an operator side transceiver may be labeled as FTU-O herein to refer to G.fast, the operator side transceiver in many instances may be considered as an xTU-O. This principle may also be applicable to transceivers on the customer side, in which a G.fast specific transceiver, FTU-R, may also be referred to as xTU-R for any TDD DSL system.

Figure 1:
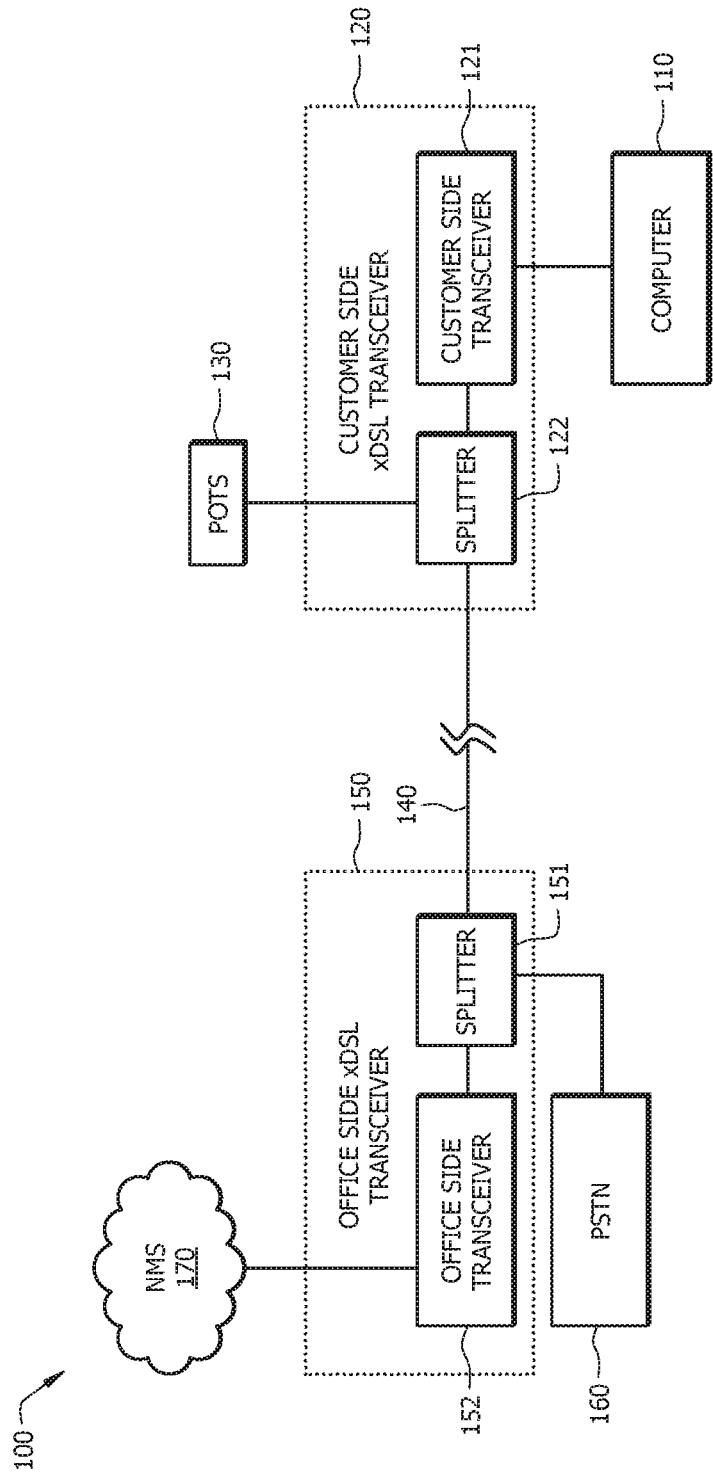
FIG. 1 is a schematic diagram of an embodiment of a system level DSL architecture.

FIG. 1 is a schematic diagram of an embodiment of a system level DSL architecture 100. The architecture 100 may comprise an operator side modem or DSLAM 150 and a customer side modem customer premises equipment (CPE) 120. The CPE modem 120 may comprise a customer side transceiver 121 and splitter 122. The customer equipment may include connections to a computer 110 and telephone service POTS 130. The DSLAM 150 may comprise an office side transceiver 152 and a splitter 151. The DSLAM 150 may additionally be connected to a network management system (NMS) 170 and a public switched telephone network (PSTN) 160. The customer side equipment 120 and DSLAM 150 may be connected by a twisted pair line 140 for data transmission.

In the US direction, a customer side transceiver 121 may receive data from a computer 110 and modulate the data into a DSL signal. The DSL signal may then be sent to a splitter 122, which may integrate the signal from the customer side transceiver 121 and the signal from POTS 130. The combined signal may then go through a twisted pair line 140 to the DSLAM 150 equipment. After processing at the transceiver 152, some of the information may be sent to a NMS 170 for monitoring purposes. For the DS direction, the signal may flow from the central office to the customer side as opposite from that of the upstream.

Figure 2:
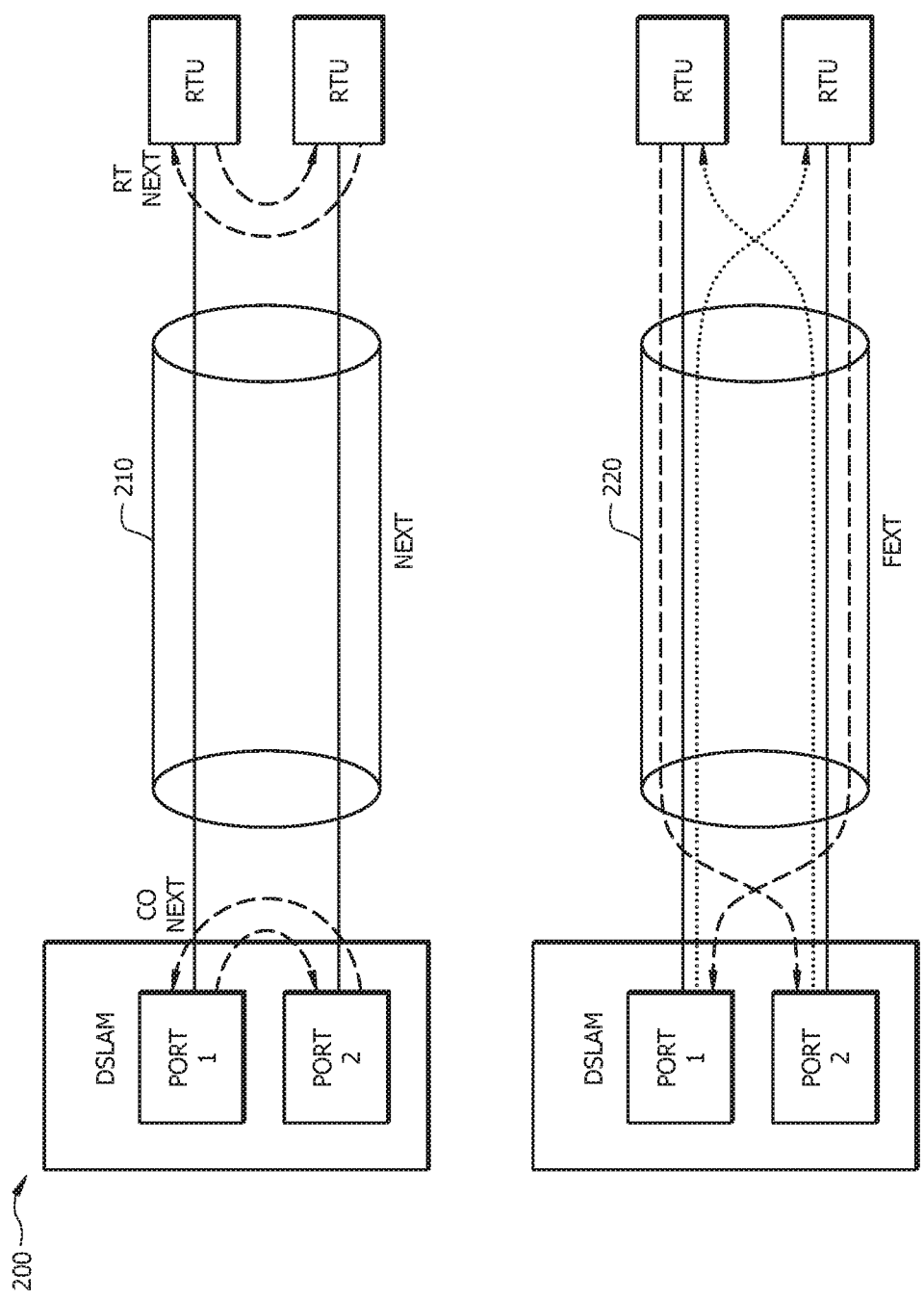
FIG. 2 illustrates a schematic of two xDSL systems 200 with two scenarios of crosstalk occurring.

An xDSL technology in an architecture embodiment such as in FIG. 1 may utilize frequencies higher than 4 KHz. Problems caused by crosstalk may become increasingly important as the frequency is increased. Crosstalk may refer to interference between twisted pairs during transmission. This interference may be divided into NEXT and far end crosstalk (FEXT). FIG. 2 shows a schematic of two xDSL systems 200 with two scenarios of crosstalk occurring. The systems 200 may comprise an occurrence of NEXT 210 and an occurrence of FEXT 220. NEXT may be defined as when interference occurs at the receiver of the same end of the cable from which the signal was transmitted. FEXT may occur when the interference propagates down and occurs at the opposite end of the cable.

DSL systems such as ADSL/ADSL2/ADSL2+ and VDSL2 may utilize FDD for DS and US transmission. In systems that employ FDD, signal transmission in the time domain may be continuous with no disruption, while there may be little to no overlap in the frequency domain between the DS and US signals. A timing advance technique may be used to make the echoed transmitted signal orthogonal to the received signal in DS and US transmission. Additionally, cyclic extensions (CE), such as cyclic prefix (CP) and cyclic suffix (CS), may be added to the symbols in order to account for different loop lengths between the multiple lines. This technique may also enable synchronization of transmission and alignment of symbols in time among multiple lines. Synchronization may make NEXT orthogonal to the received signal in both DS and US directions. NEXT may be filtered out and may not affect link performance; however, FEXT may still cause the data rate to decrease and produce instability in the link carrying service.

The VDSL2 standard may utilize DMT transmit symbols, as described in Recommendation ITU-T G. 993.2, entitled "Very high speed digital subscriber line transceivers (VDSL2)", dated December 2011, which is incorporated herein by reference as if reproduced in its entirety. The transmit DMT symbol may be time domain samples produced from the DMT modulator. Inverse discrete Fourier transform (IDFT) modulation of the N sub-carriers may construct 2N real values $x_n$, where n=0, 1, . . . , 2N−1, which is subsequently followed by cyclic extension, windowing, and overlap operations.

Figure 3:
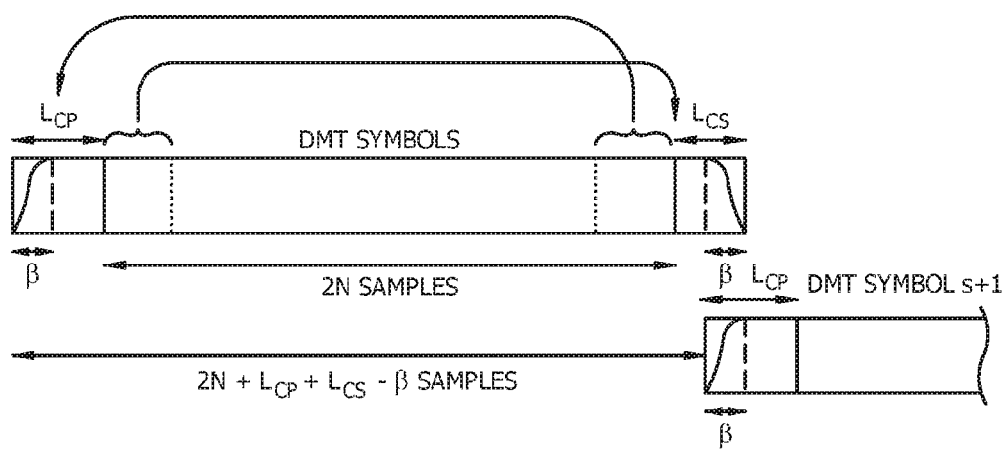
FIG. 3 illustrates an embodiment of operations performed by a transmitter for construction of consecutive DMT symbols.

FIG. 3 illustrates an embodiment of operations performed by a transmitter for construction of consecutive DMT symbols. The DMT symbol may comprise 2N samples, a cyclic prefix of length $L_{CP}$, and a cyclic suffix of length $L_{CS}$. The cyclic suffixes of consecutive symbols may overlap by β windowed samples. $L_{CP}$ may represent the length of the last samples of the IDFT output $x_n$ attached as a prefix to the 2N output IDFT samples $x_n$. $L_{CS}$ may represent the length of the first samples of $x_n$ added as a suffix to the $x_n+L_{CP}$ samples. β may be the length of the windowing function, where the first β samples of the CP of current DMT symbol and last β samples of the CS of previous DMT symbol are employed in windowing of the transmitted signal. The window sample values may be determined according to a vendor's discretion. In an embodiment, the maximum value of β may be min(N/16, 255). Furthermore, the β samples (e.g., the windowed parts) of consecutive symbols may overlap and be added to one another.

The cyclic extension (CE) length may be defined as $L_{CE}=L_{CP}+L_{CS}-\beta$, wherein values of the components may be set accordingly to satisfy the equation $L_{CE}=L_{CP}+L_{CS}-\beta=m\times N/32$, where m may be an integer value between 2 and 16, inclusive. Support for choosing the value of m=5 may be mandatory. In all cases, $\beta<L_{CP}$ and $\beta<L_{CS}$ should hold true. CS and CP may also be partitioned according to a vendor's discretion. The specific settings of the CE and CP may be exchanged during initialization.

Utilizing a CS during VDSL2 transmission may be beneficial in helping reduce spectral leakage with a transmit windowing technique. The windowing function may shape the envelope of the transmitted signal in order to lower leakage issues. A CS may also make an echo signal and receiver (Rx) signal to be orthogonal to each other due to a timing advance technique. The timing advance may enable alignment and synchronization of symbols at transceivers of both the office side and customer side.

Figure 4:
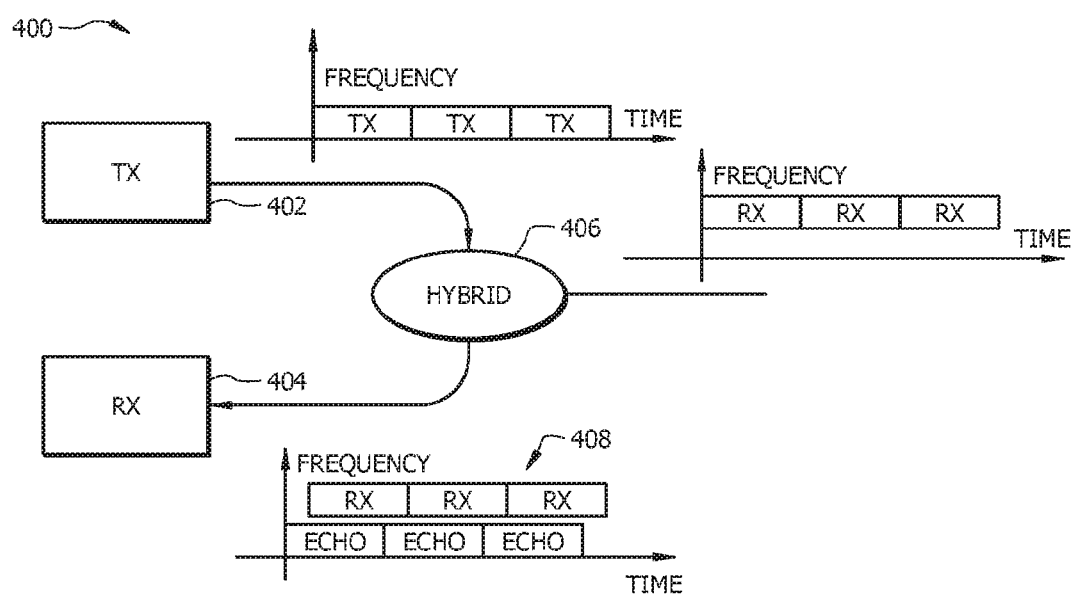
FIG. 4 illustrates an embodiment of signaling experienced by a transmitter (TX) and a receiver (RX) in a FDD modem.

A VDSL2 system may employ different frequency bands for DS and US signals. However, signals may be transmitted at the same time, and VDSL2 transceiver units (VTUs) may show the transmitted data as resulting echo signals. In order to attenuate an echo, a hybrid may be used. In an embodiment, a hybrid may reduce an echo by about 18 decibels (dB). FIG. 4 illustrates an embodiment of signaling experienced by a transmitter (TX) and a receiver (RX) in a FDD modem 400. The modem 400 comprises the transmitter 402, the receiver 404, and a hybrid or hybrid circuit 406. The hybrid 406 may be a circuit used to couple signals from the transmitter 402 and the receiver 404 into one line. FIG. 4 shows that the signal from the transmitter 402 may leak into the signal received by receiver 404. This leakage may subsequently show up as an echo signal. The signal received by the RX 404 is a superposition 408 of the echo signal and a desired signal as illustrated.

Figure 5:
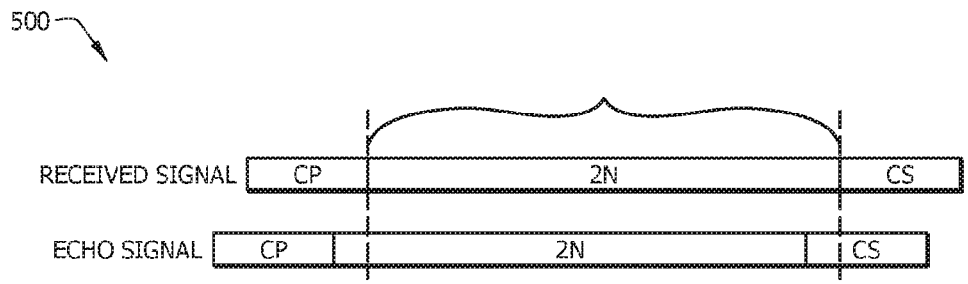
FIG. 5 is an embodiment of overlap between a received signal and echo signals.

FIG. 5 is an embodiment of overlap 500 between a received signal and echo signals. When DS and US signals are transmitted at the same time, a receiver may obtain both the received signal from the remote side and the echo signal from the local side. If the echo signal and received signal are not orthogonal, then the echo signal may contribute to spectral leakage into the received signal band, which may further result in the received signal's signal-to-noise ratio (SNR) degradation. A CS may be introduced in order to keep the echo signal and the received signal orthogonal. Additionally, a timing advance may be used to minimize the length of the CS.

By way of further example, suppose a signal from a VDSL2 transceiver unit on the remote side (VTU-R) is transmitted Δt behind a signal from a VDSL2 transceiver unit on the office side (VTU-O). The signal may have a propagation delay of $t_0$. Thus, the misalignment of the receiving signal and echo at VTU-O may be $|\Delta t+t_0|$, while the misalignment at VTU-R may be $|\Delta t-t_0|$. The value of CS may then need to be the maximum of $|\Delta t+t_0|$ and $|\Delta t-t_0|$. If both VTU-O and VTU-R start at the same time, then Δt is equal to zero, and CS may have the minimum length. The timing advance technique in VDSL2 G.993.2 may be utilized to allow the transmitting signals for VTU-O and VTU-R to start at the same time. In this case, a maximum CS/2 may be available in both directions for the far-end signal to arrive at the receiver without causing spectral leakage.

The ITU-T standard G.fast may provide broadband access over copper pairs from the fiber to the distribution point (FTTDP) near the CPE. G.fast was developed to standardize FTTDP application scenario to address ultra-high speed access on short drop-wire copper lines from distribution points. G.fast may utilize TDD as the physical (PHY) layer duplexing method and DMT as modulation. In order to avoid NEXT, all of the ports at the same FTTDP node may need to align their DS and US time slots. Alignment of DS symbols of all transmitters and US symbols of all receivers at FTU-O's may be desirable for FEXT cancellation of DS and US signals, respectively.

Figure 6:
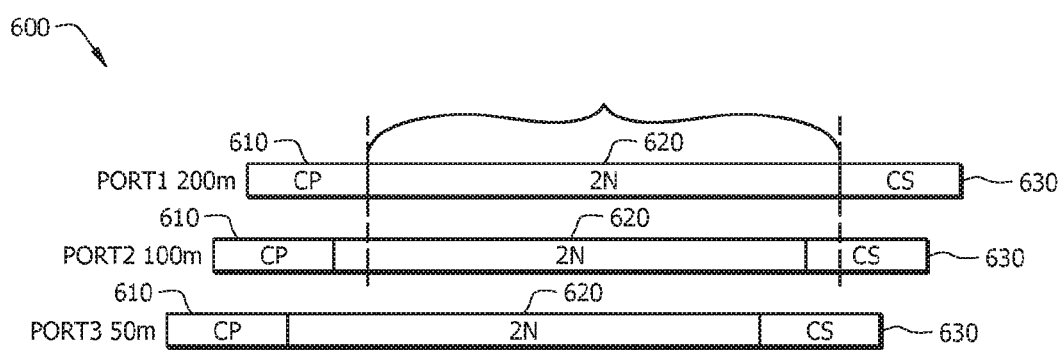
FIG. 6 illustrates an embodiment of loop lengths for various ports.

DS symbol alignment for multiple ports may be achieved in a straightforward manner due to the collocated nature of the FTU-O's; however the alignment of US symbols from all of the ports arriving at the FTU-O's may not be as straightforward due to unequal loop lengths. FIG. 6 illustrates an embodiment of received symbols for various loop lengths for various ports. A DMT symbol may comprise a CP 610, 2N samples 620, and a CS 630. The differing lengths of the three lines may result in timing offsets between various signals arriving from the customer premises. For example, US symbols from port 1, which has a loop length of 200 m, may reach an FTU-O port later than US symbols from port 3, which has a loop length of 50 m. In order to account for the time differences between the ports, a CS may be employed.

In an embodiment, a Gigabit Passive Optical Network (GPON) standard may utilize a scheme for upstream synchronization of optical signals, as described in Recommendation ITU-T G. 984.3, entitled "Gigabit-capable Passive Optical Networks (G-PON): Transmission convergence layer specification", dated March 2008, which is incorporated herein by reference as if reproduced in its entirety. GPON's upstream alignment mechanism may be similar to a method of time alignment and may employ the following steps. An optical line termination (OLT) unit may send an upstream request frame to an optical network termination (ONT) unit, with a time stamp recording the sending time T1. The ONT may receive the frame and record the time T2. After processing, the ONT may send an US register frame and may record the sending time T3. The OLT may then calculate the spread time (or propagation delay) of the loop as follows:

$$T_{spread} = \frac{T_2 - T_1 + T_4 - T_3}{2} \quad (1)$$

Next, the OLT may calculate the time that the ONT may delay after it receives the upstream request frame by Delay=$T_{max}$−$T_{spread}$. In an embodiment, $T_{max}$ may be the spread time over a 60 km fiber. The OLT may send the delay information to the ONT, which may use the delay before transmitting the US frames. After the ONT carries out the delay, the ONT's signal may appear to have been transmitted 60 km away from the OLT; thus, the US signal may be aligned to its assigned time-slot. Overall, this scheme may be highly complex, requiring several complicated steps at the operator side. A simplified approach for alignment may be desirable. It is noted here that GPON in upstream uses TDMA time-division multiple access and in this system there should be no time-overlap among the upstream transmitted optical signals using the same fiber as the communication media.

For the G.fast standard, a TDD method and a DMT method (e.g., orthogonal frequency division multiplexing (OFDM)) may be chosen. In TDD, the US and DS may be divided in time rather than in frequency (as in FDD) to avoid local echo and NEXT from disturbing the received signal. The DS and US time slots may be synchronized and aligned among ports. In order to reduce the effect of FEXT, all US symbols may be transmitted at the same time similar to the method of timing advance used in FDD for VDSL2 systems. However, the timing advance of FDD in VDSL2 systems may be originally proposed to counter echo and NEXT by forcing the CO and CPE transmitters to start at the same time. Due to different loop lengths, a CS may be utilized to guarantee synchronization of all CPE transmitted signals at the CO. In TDD methods, there may be no echo or NEXT since there is no time overlap between transmitter and receiver signals. Additionally, there may be no orthogonally issue of DS and US signals, as long as there is no time overlap between the two. Thus, the need for CS may be eliminated if all of the US signals from different lines arrive at a FTU-O (a G.fast transceiver unit at office) at the same time.

Disclosed herein are systems, methods, and apparatuses for alignment of US DMT symbols of multiple lines in a TDD xDSL system. Schemes are proposed to achieve US symbol alignment at a transceiver unit at the central office side. Some embodiments may include estimating loop length (or equivalently propagation delay) at a transceiver unit at a remote customer side. Transceivers at the office side (e.g., FTU-O) may be collocated at a distribution point unit (DPU). If all of the US signals from different lines use identical DMT symbol lengths with the equal lengths of CP and arrive at the FTU-O at the same time, a CS may not be necessary. Thus, the upstream CS may be removed in a DMT symbol structure, leading to less overhead and more efficient physical media dependent (PMD) layer signaling.

Some DSL systems, such as G.fast, employ TDD for DS and US signal transmission. G.fast modems may perform on loop lengths up to 400 m long, along with a maximum frequency of 250 MHz for data transmission. In an embodiment, a short loop for G.fast may be 50 m or less. By way of further example, suppose FTU-Rs transmit upstream signals at the same time, and the corresponding FTU-O's are collocated. In this case, the difference in arrival times of the upstream signals at FTU-O's may be as large as 2 microseconds (µs). This may indicate that if the CS is used to cover the difference, the CS may need to be at least 2 µs long. This value may be a large overhead when the symbol period is in the range of only a few microseconds, which may be typical for G.fast. Eliminating the CS length may subsequently improve data throughput in a system.

In a DSL system such as a G.fast system, an FTU-R may receive downstream symbols and estimate or measure the signal propagation delay (sometimes referred to as signal spread time) from FTU-O to FTU-R or from FTU-R to FTU-O. The propagation delay may be denoted as $T_{pd\_R}$. In order to implement an upstream symbol alignment method, a delay value $T_{max}$ may also be defined. FTU-R may calculate T2, which is the time the receiver may need to wait before transmitting the US symbol. T2 may be determined as follows:

$$T2 = T_{max} - 2 \cdot T_{pd\_R} \quad (2)$$

$T_{max}$ may represent an upper bound or maximum delay that a receiver may wait to transmit an US symbol. $T_{max}$ may, for example, be two times the propagation delay of the longest loop as defined by an FTU-O.

After the downstream time slot, the FTU-R may wait for a time period equivalent to the value of T2 plus the FTU-R switching time before transmitting the upstream symbol. The FTU-R may use the FTU-R switching time to prepare the upstream symbols after receiving the last symbol. In an embodiment, the switching time may be zero. The switching time is the time it takes for the transceiver to prepare to transmit the first sample after receiving the last received signal sample.

If the FTU-R's estimation of the loop length is inaccurate, the upstream symbol alignment may be further enhanced as follows. FTU-R may send special upstream symbols to FTU-O, and FTU-O may receive these symbols and send a tuning information ΔT to FTU-R. This information may be received by FTU-R and may be used to modify and customize the sending time of the FTU-R's upstream symbols accordingly.

Figure 7A:
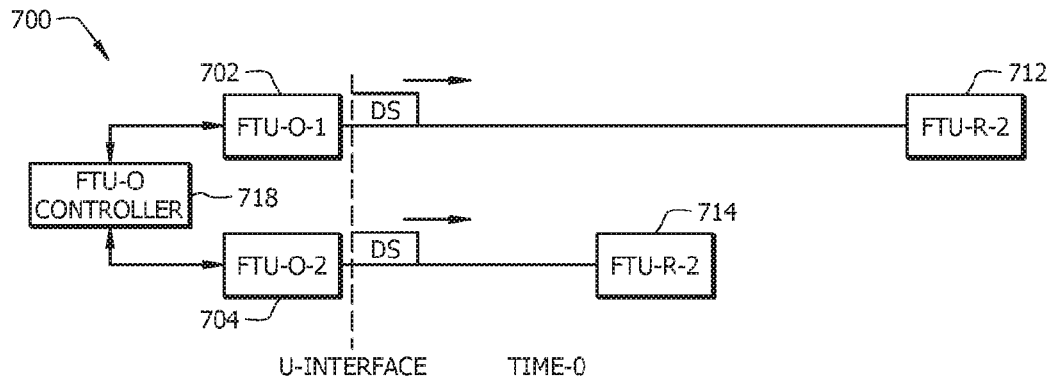
FIGS. 7A, 7B, and 7C illustrate embodiments of downstream symbol alignment at different time points.
Figure 7B:
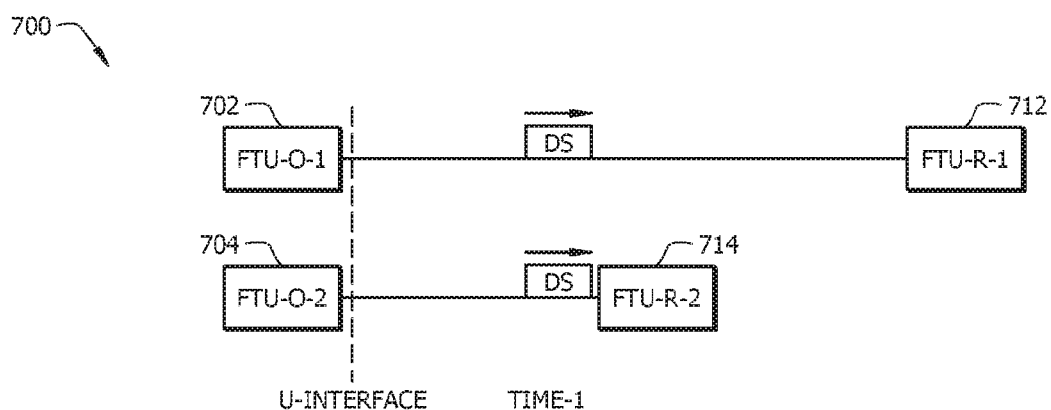
Figure 7C:
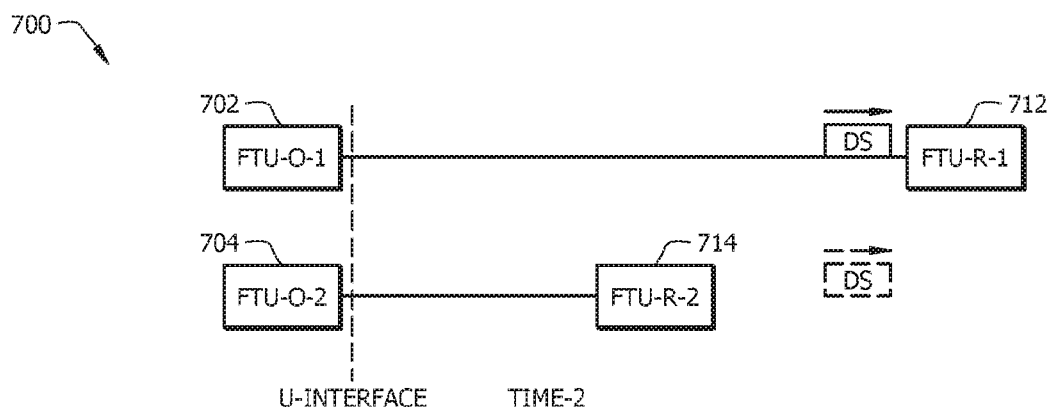

FIGS. 7A, 7B, and 7C illustrate embodiments of downstream symbol alignment at different time points. The system 700 comprises FTU-O-1 702, FTU-O-2 704, FTU-R-1 712, FTU-R-2 714, FTU-O controller 718. FTU-O-1 702 and FTU-R-1 712 may be an office-side transceiver and a customer-side transceiver, respectively, for port 1 in a G.fast system. Similarly, FTU-O-2 704 and FTU-R-2 714 may be an office-side transceiver and a customer-side transceiver, respectively, for port 2 in the same system. The U-interface may be a common interface for operator-side transceivers such as FTU-O-1 702 and FTU-O-2 704. The connection between an FTU-R and an FTU-O is through a copper pair, with the customer premises endpoint designated as the U-R reference point (or U-interface for short) and the network endpoint designated as the U-0 reference point (or U-interface for short). Although only two FTU-O's 702 and 704 and two FTU-Rs 712 and 714 are shown for illustrative purposes, any number of each component may be utilized for a plurality of ports in an xDSL system.

An FTU-O controller 718 may be a controller software or hardware entity utilized to coordinate and manage the operation of all FTU-O's. At time 0, system 700 shows that DS symbol alignment between ports may easily be achieved by transmitting the DS symbols at the same time due to collocation of all of the FTU-O's 702, 704. The transmitted DS symbols from all of the ports may be aligned at FTU-O's to facilitate vectoring and FEXT cancellation.

System 700 depicts two ports with different loop lengths. Port 2 of FTU-O-2 704 may comprise a shorter loop than port 1 of FTU-O-1 702. Thus, the short loop's FTU-R-2 714 may receive DS symbols earlier than FTU-R-1 712. In FIG. 7B, system 700 at time 1 shows that the FTU-R-2 714 may receive DS symbols earlier than FTU-R-1 712 due to the short loop in port 2. The FTU-R-2 714 may then estimate the propagation delay ($T_{pd\_R2}$) from FTU-O-2 704 to FTU-R-2 714 and calculate the waiting time T2 using the following equation:

$$T2=T_{max}-2\cdot T_{pd\_R2} \quad (3)$$

$T_{max}$ in Equation 3 may be determined by FTU-O-2 and may be twice the propagation delay of the longest loop. DS symbol may only reach FTU-R-1 712 in the next time point, time 2, as depicted in FIG. 7C's snapshot of the symbol timing. Later on at port 1, the estimated delay time $T_{pd\_R1}$ may be greater than $T_{pd\_R2}$ determined by FTU-R-2 714. Thus, FTU-R-1 712 may calculate the time that it may wait as follows:

$$T2=T_{max}-2\cdot T_{pd\_R1} \quad (4)$$

The estimation of the propagation delay for a given loop may be implemented in a number of ways, including but not limited to the following algorithm: (1) estimate the loop attenuation from a received signal (e.g., the received signal comprising at least one DMT symbol), (2) estimate the loop length from the loop attenuation, and (3) estimate the loop delay time from the loop length. This algorithm may be employed in either an FTU-O (e.g., estimation of propagation delay based on received signal from an FTU-R) or an FTU-R (e.g., estimation of propagation delay based on received signal from an FTU-O).

Figure 8A:
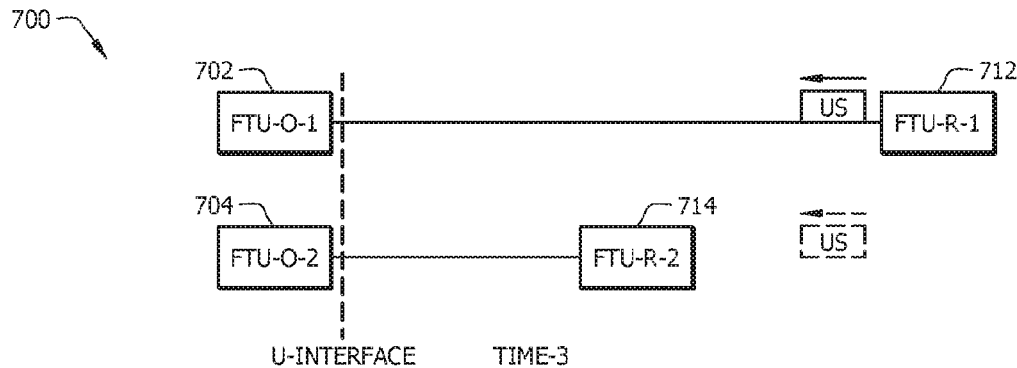
FIGS. 8A, 8B, and 8C illustrate TDD upstream symbol alignment at different time points.
Figure 8B:
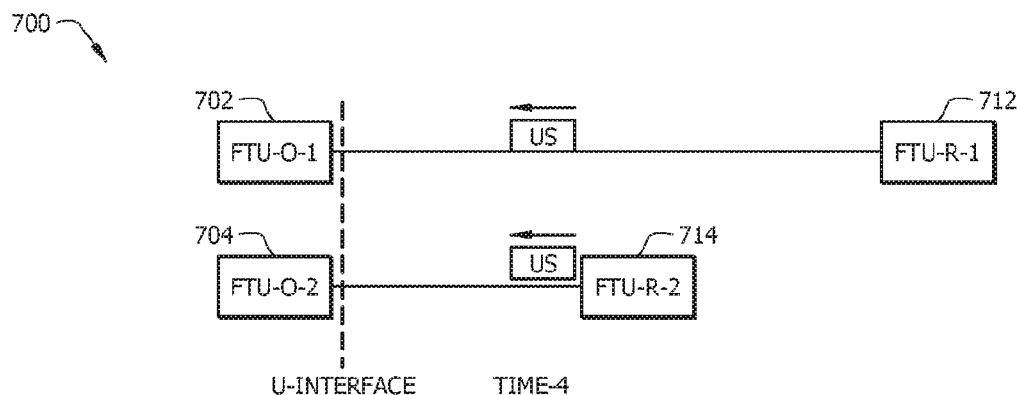
Figure 8C:
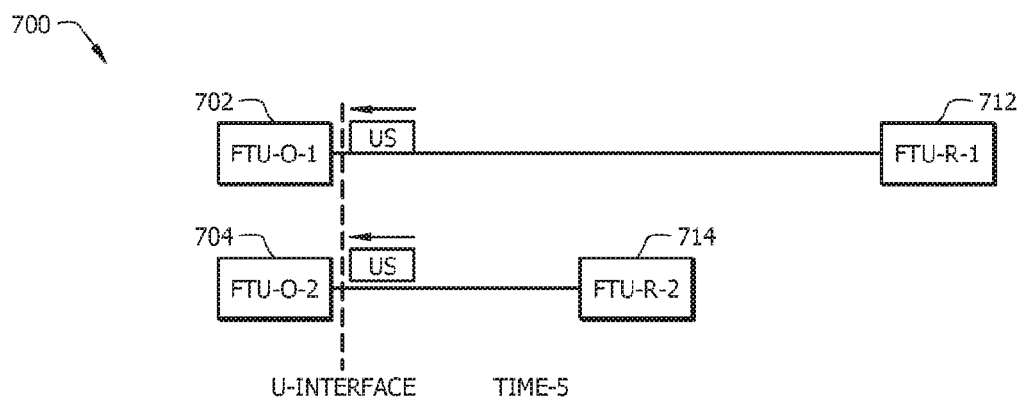

FIGS. 8A, 8B, and 8C illustrate TDD upstream symbol alignment at different time points. The system 700 at time 3 in FIG. 8A illustrates that FTU-R-1 712, which has a longer loop than the other transceiver, may transmit US symbols earlier than FTU-R-2 714. At time 4 in FIG. 8B, the FTU-R-1 712's US signal may reach a distance away from FTU-O-1 702 that may be approximately equal to FTU-R-2 714's distance away from FTU-O-2 704. At this point, the FTU-R-2 714 may start transmitting US symbols to FTU-O-2 704. This may be conducted to account for propagation delay and loop length differences.

By way of further example, suppose the last DS sample in FIG. 7C is transmitted at T0 and may arrive at FTU-R-2 714 at T0+$T_{pd\_R2}$. The FTU-R-2 714 may then wait for $T_{max}$-2·$T_{pd\_R2}$ before transmitting the first sample US. The following Equations 5 and 6 may define the transmit time, $T_{transmit}$.

$$T_{transmit}=T0+T_{pd\_R2}+T_{max}-2\cdot T_{pd\_R2} \quad (5)$$

$$T_{transmit}=T0+T_{max}-T_{pd\_R2} \quad (6)$$

The propagation delay from FTU-R-2 714 to FTU-O-2 704 may be $T_{pd\_R2}$, so that the arrival time may be T0+$T_{max}$. FTU-R-1 712's first sample may also arrive at FTU-O-1 702 at time T0+$T_{max}$, so that the US signals may be aligned at the DPU where all FTU-O's are collocated.

Figure 9:
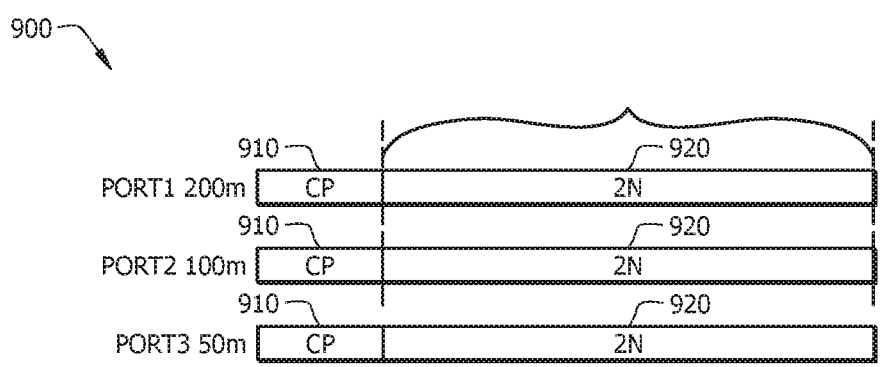
FIG. 9 shows an embodiment of symbol alignment for ports of varying loop lengths.

At time 5 in FIG. 8C, the US symbols of both ports may arrive at the same time at their respective office-side transceivers. FTU-R-1 712's and FTU-R-2 714's US symbol alignment at FTU-O-1 702 and FTU-O-2 704, respectively, may depend on the loop length estimation accuracy. FIG. 9 illustrates an embodiment of symbol alignment for ports of varying loop lengths. The embodiment may comprise a cyclic prefix (CP) 910 and samples 2N 920 and may represent one DMT symbol. Since the US symbols arrive at the corresponding FTU-O's at the same time, the CS may not be needed. FIG. 9's TDD upstream alignment embodiment contrasts with the embodiment in FIG. 6, in which CS is required due to the lack of symbol alignment in the ports with varying loop lengths.

Figure 10:
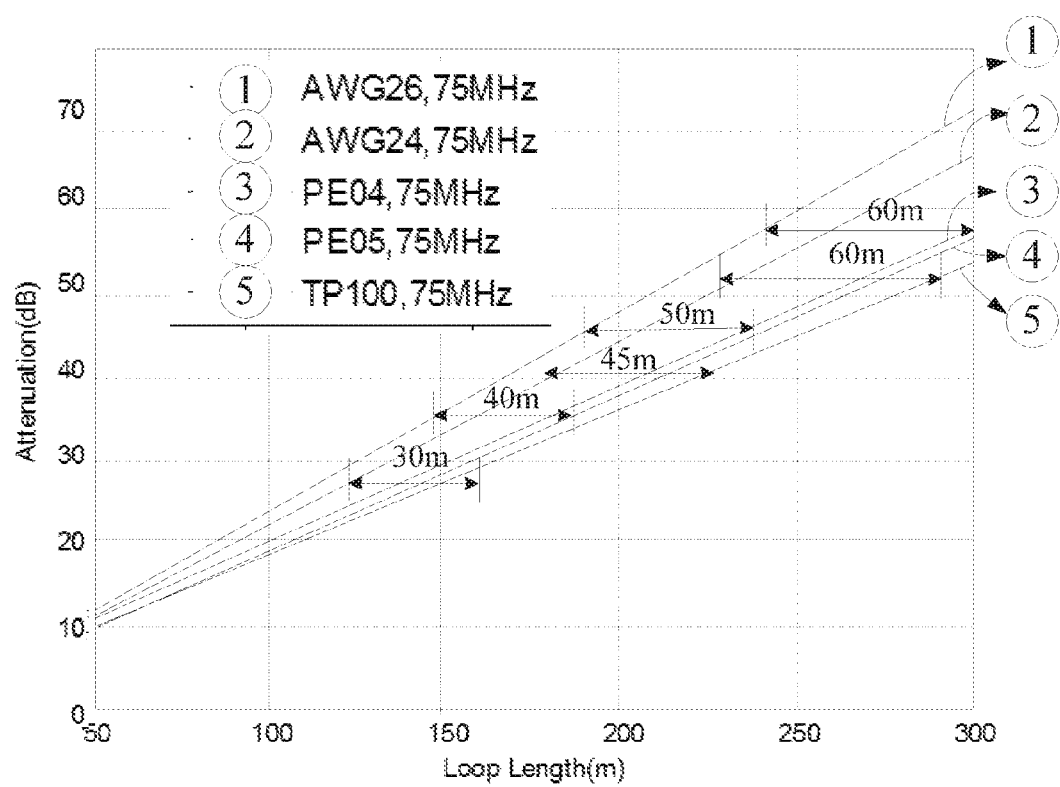
FIG. 10 illustrates loop attenuation versus loop length for different loop types.

FIG. 10 illustrates loop attenuation versus loop length for different loop types at 75 MHz. FIG. 10 illustrates attenuation data for loop types AWG26, AWG24, PE04, PE05, and TP100. These loop types are well understood by a person of ordinary skill in the art in DSL systems. For example, AWG26 and AWG24 are American Wire Gauge (AWG) 26 and 24 gauge, respectively. Each of the loop types represented in FIG. 10 may transmit at 75 MHz or at another frequency value of interest, as 75 MHz was chosen for illustrative purposes. Assuming that the loop type is known or can be estimated with reasonable accuracy, the attenuation curves can be used by a receiver, such as FTU-R, to estimate loop length based on power of a received signal. That is, a signal with known power may be transmitted to an FTU-R, and the loop length may be estimated based on the attenuation. If the loop length is known, the propagation delay can be determined from the loop length (because the speed of signal travel is known, e.g., 2×10$^8$ m/s).

There may be different ways of dealing with an unknown loop type. In one alternative, an average of the curves shown in FIG. 10 may be used to generate a curve that is applied regardless of loop type. In another alternative FTUs may have an apriori knowledge of the loop type. In yet another alternative, the loop type may be estimated. Based on the attenuation in FIG. 10, if the loop type is unknown and the average curve is used, the loop length estimation error may be as large as 15%. If the loop type is estimated incorrectly, the loop length estimation error may be 30%. However, if the loop type estimation is accurate, the loop length estimation error may theoretically be zero.

To estimate loop length and propagation delay when strong FEXT signals are present, a signal uncorrelated with the FEXT signals may be used. For example, by making the synchronization symbol (so-called sync symbol) of each line derived from a different PRBS generator, each receiver will be able to detect its corresponding direct-channel signal and reject signals from the FEXT channels; therefore, estimating the propagation delay of the direct channel. Alternatively, the sync symbols maybe transmitted sequentially by each FTU in a TDMA fashion so that there will be no time overlap among the transmitted signals to eliminate FEXT. Sync symbols are defined and used in all xDSL standards including VDSL2/G.993.2 and and G.fast.

In the case that the FTU-R's estimation of the loop length is inaccurate, an additional technique may be performed. The FTU-R (e.g., FTU-R-1 712 or FTU-R-2 714) may send special US symbols to FTU-O (e.g., FTU-O-1 702 or FTU-O-2 704). The corresponding FTU-O may receive these symbols and use correlation or other methods to estimate an alignment offset between the FTU-R US symbol and a reference. The FTU-O may then send a tuning offset information Δt to FTU-R, which may receive this information and tune the transmit time of the US symbols accordingly (e.g., advance or delay transmissions by Δt).

Without these techniques for proper initial US symbol alignment, a joining line may transmit its initial special US symbol at an arbitrary offset time that may cause significant problems for US FEXT cancellers of other lines. If a line uses the timing advance method of VDSL2, its US symbol may be off by 1 μs on a 200 m line if the speed of electrons on copper is assumed to be 2×10$^8$ m/s. Using the TDD symbol alignment method described herein, the maximum offset may be 15% of the estimated length, which translates to 0.15 μs on a 200 m line. In this case, there may be a seven-fold improvement in accuracy. With a symbol period of 20 us, a 0.15 us offset may create a worst case scenario of −42.5 dB of accumulated noise leakage from the new joining line to other lines. This leakage may not be cancelled out by the upstream FEXT cancellers. However, noise of 42.5 dB below the signal may not be expected to cause significant problems in G.fast. Without the disclosed method, the noise level may be only 25.6 dB below signal level that may make other vectored upstream lines unstable.

Figure 11:
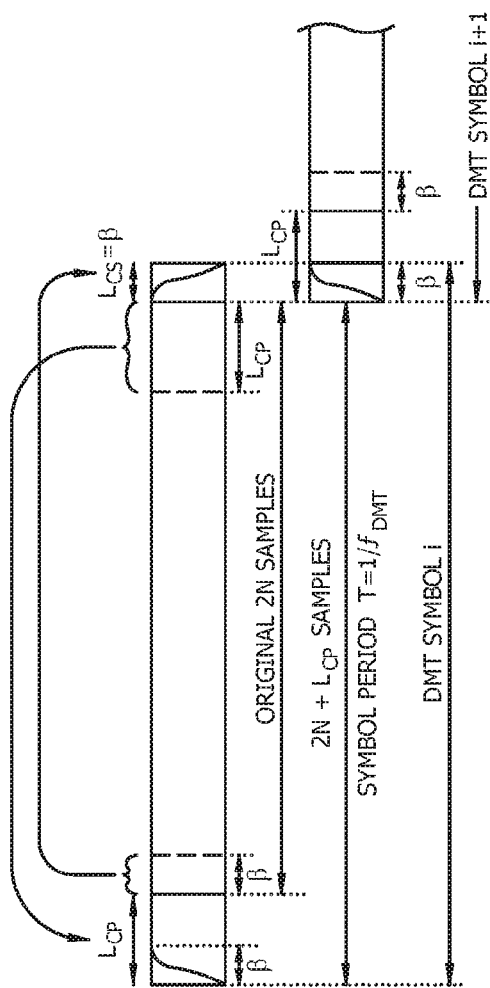
FIG. 11 illustrates an embodiment of consecutive DMT symbols for the G.fast standard.

For symbol alignment, G.fast standard may employ a specific symbol structure for upstream and downstream alignment. FIG. 11 illustrates an embodiment of consecutive DMT symbols for the G.fast standard. The symbol may comprise an original 2N samples, a cyclic prefix of length $L_{CP}$, and a cyclic suffix of length $L_{CS}$. The cyclic suffixes of consecutive symbols may overlap by β windowed samples. The length of CS $L_{CS}$ may be equal to β. In an embodiment, the CS samples with length $L_{CS}$=β may be completely overlapped with the first β samples of the CP of the next symbol to undergo the windowing operation. As compared with the DMT samples for VDSL2 in FIG. 3, no additional CS samples may be transmitted. Therefore, the length of the transmitted symbols may be simplified to 2N+$L_{CP}$, and the aforementioned TDD US symbol alignment may subsequently be performed.

Figure 12:
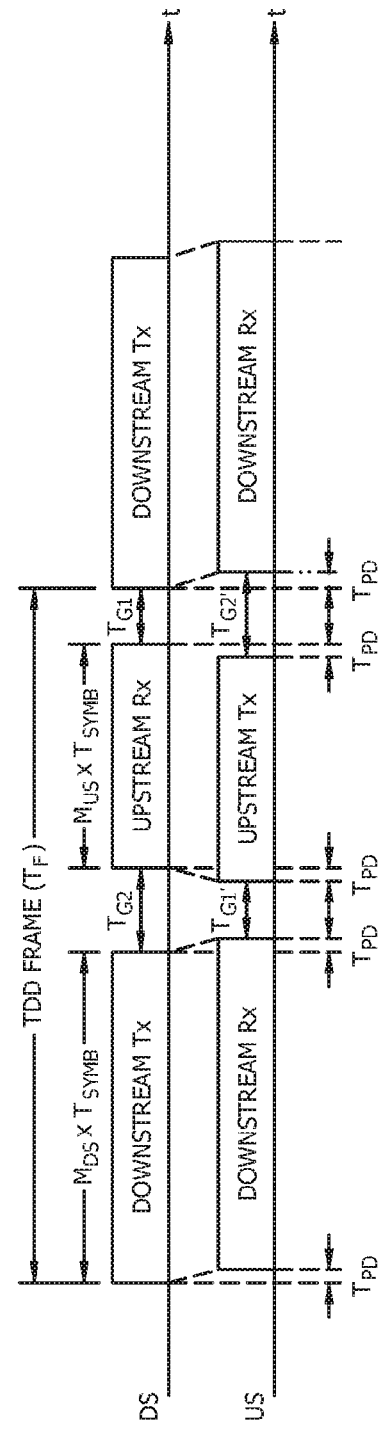
FIG. 12 shows an embodiment of a TDD frame structure for G.fast.

FIG. 12 shows an embodiment of a TDD frame structure for G.fast. The format of a TDD frame may be presented in FIG. 12 with the following notations describing the TDD frame parameters. Values of $T_{g1}$ and $T_{g2}$ are the gap times at the U-interface of the FTU-O, while $T_{g1'}$ and $T_{g2'}$ are the gap times at the U-interface of the FTU-R. Both the FTU-O and FTU-R may transmit in respect to downstream and upstream symbol boundaries, respectively. In all cases, the sum $T_{g1}$+$T_{g2}$=$T_{g1'}$+$T_{g2'}$ may be equal to the duration of one DMT symbol. The value of $T_{g1'}$ may not exceed 9 μs.

$T_{pd}$ may denote a propagation delay of a signal from the FTU-O to FTU-R and vice versa. The variable $T_F$ may define the frame period. The TDD frame period may be an integer multiple of DMT symbol periods. Therefore, one TDD frame may contain $M_{ds}$ symbol periods dedicated for downstream transmission, $M_{us}$ symbol periods dedicated for upstream transmission, and a total gap time ($T_{g1}$+$T_{g2}$) equal to one symbol period. Hence, $T_F$ and $T_{symb}$, the symbol period, may be defined in the following Equations 7 and 8, respectively:

$$T_F = (M_{ds} + M_{us} + 1) \times T_{sym} \quad (7)$$

$$T_{symb} = \frac{1}{f_{DMT}} = \frac{2N + L_{CP}}{2N \times \Delta f} \quad (8)$$

The downstream transmit symbol boundary may be aligned at the TDD frame boundary. The default value of $T_F$ may be any number greater than or equal to three (i.e., at least one US symbol, one DS symbol, and one symbol of gap time). Other values of $T_F$ may be employed for further study. In an embodiment, all valid values of $T_F$ may be equal to or less than 36 symbols. The frame parameters $M_{ds}$ and $M_{us}$ may be set at initialization, according to the corresponding management information base (MIB) parameters.

In order to enable initial US symbol alignment (synchronization) at the DPU, the length of the total gap time at both FTU-O and FTU-R may be limited to one DMT symbol, and the value of $T_{g1'}$ may not exceed 9 us. This information, including FIG. 12's TDD frame structure, may provide necessary information for an implementation of US alignment.

As mentioned, in order for the transmitted US DMT symbols to arrive at the same time at the DPU, the FTU-R located on a shortest loop may start transmitting after a longest delay, while the FTU-R located on a longest loop may start transmitting after a shortest delay. Since the FTU-R's may be from different vendors, the transceivers may each utilize different values for the shortest delay ($T_{g1'\_min}$), which may result in problems in US symbol synchronization. The shortest delay, which may be referred to as switch time or switching time, may be a hardware limitation. To mitigate this issue, the standard may either impose a strict value on the switching time or make it a parameter that FTU-O's will send to an FTU-R at the early stage of initialization. This may ensure that each transceiver will be using the same value. This value may be the upper bound on switching time, which may be denoted as $ST_U$. For example, $ST(i) \leq ST_U$ for all values of i, where $ST(i)$ may be the switching time of FTU-R(i).

Figure 13:
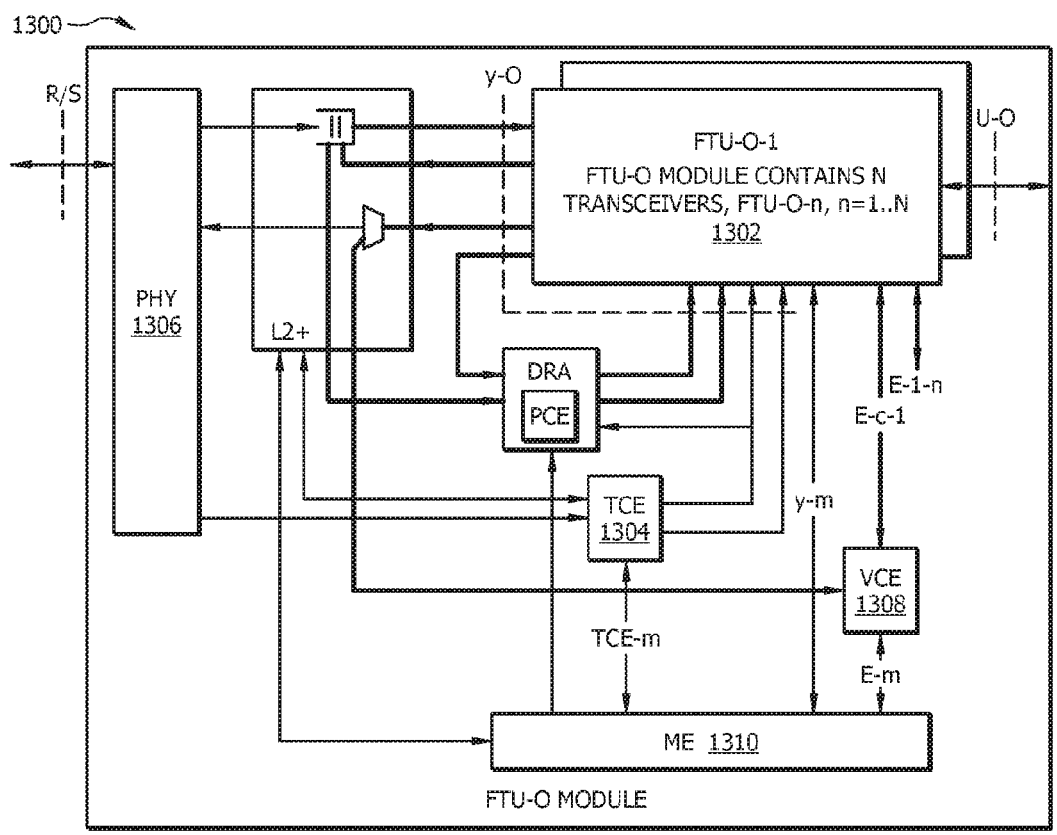
FIG. 13 is an embodiment of an operator side apparatus which may implement timing alignment.

FIG. 13 is an embodiment of an FTU-O module 1300 which may implement timing alignment. The FTU-O module 1300 may also be referred to as a DPU. The FTU-O module 1300 may comprise N FTU-O transceivers 1302, a timing control entity (TCE) 1304, a PHY block 1306, a vectoring control entity (VCE) 1308, and a management entity (ME) 1310.

The PHY block 1306 may represent the physical layer of the FTU-O module 1300 towards the access network and of the network termination (NT) towards the customer premises (CP). The L2+ blocks represent the Layer 2 and above functionalities contained in the FTU-O module 1300 and the NT. These blocks may be shown for completeness of the data flow. FIG. 13 shows the reference model with the logical information flows within the FTU-O module 1300. The common element of all forms of coordination may be synchronous and coordinated transmission or synchronous and coordinated reception of signals from all N wire pairs connected to the FTU-O module 1300 (e.g., the coordinated group). Thus, the signals may be represented as a vector where each component may be the signal on one of the lines (shown as thick lines in FIG. 13). The management of an FTU-O module 1300 may be performed by the NMS, passing management information to the ME 1310. Inside the FTU-O module 1300, the ME 1310 conveys the management information (over an interface here called TCE-m) to the TCE 1304. The VCE 1308 coordinates the crosstalk cancellation over the coordinated group.

The TCE 1304 may be employed at the DPU in order to send the longest possible loop length $L_{max}$, or its corresponding propagation delay $D_{max}$, and $ST_U$ to the FTU-R's through FTU-O transceivers 1302. This may allow the FTU-R's to perform the aforementioned US symbol synchronization disclosed herein.

Alternatively, TCE 1304 may send a $T_{g2}$ value to FTU-R's. The FTU-R's may then compute $T_{g1'}$ as follows:

$$T_{g1'}(i)=T_{g2}-2 \times D(i) \quad (9)$$

$D(i)$ may be the one-way propagation delay of FTU-R(i) connected to FTU-O(i). US symbol synchronization may be achieved if each FTU-R follows the above Equation 9. However, the value of $T_{g2}$ may depend on the delay $D_{max}$ of the longest possible loop length $L_{max}$ within the DPU and $ST_U$. $T_{g2}$ may then be computed by the following equation:

$$T_{g2}=ST_U+2 \times D_{max}+K \quad (10)$$

K may be a constant and may be set to zero. The $ST_U$ value may either be communicated to all the FTU-R's to comply with the value or it may be specified in the standard to enable initial US symbol synchronization. The value of $ST_U$ may have to be kept as small as possible to allow a large $D_{max}$ for a desired $T_{g2}$. By way of further example, suppose there is a propagation delay of 0.5 µs per 100 m in a copper wire. The value of $T_{g2}$ may be assumed to be no greater than 10 µs to allow at least 9 µs for $T_{g1}$. If the value of $ST_U$ is set to 8 us, the loop length difference between the shortest and the longest loops in the DPU group may only be 200 m. If the value of $ST_U$ is set to 6 us, the loop length variation may be up to 400 m. If the aforementioned rule is disregarded, the initial US symbol synchronization and fine tuning in later stages may not be performed properly.

Alternatively, TCE 1304 may send a $T_{g1'}$ value to each of the FTU-R's. The value for the ith FTU-R may be $T_{g1'}(i)$. As discussed previously, the propagation delay D(i) may be estimated in FTU-O(i) based on a received signal from FTU-R(i) using an algorithm discussed previously. The TCE 1304 or other part of the DPU may compute $T_{g1'}(i)$ based on the computed D(i) and then FTU-O(i) may send the value of $T_{g1'}(i)$ to FTU-R(i), for all i=1, 2, . . . ,n.

Figure 14:
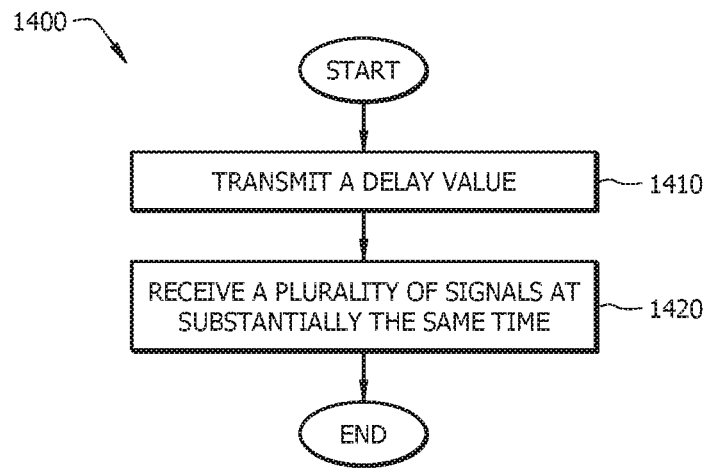
FIG. 14 is a flowchart of an embodiment of an upstream symbol alignment method.

FIG. 14 is a flowchart of an embodiment of an upstream symbol alignment method 1400. The method may be performed in a DPU. The method begins in block 1410 in which a delay value may be transmitted to a plurality of DSL transceivers (e.g., by corresponding transceivers or FTU-Os in the DPU). The delay value may be transmitted by representing the delay value as a series of bits in a packet. The plurality of DSL transceivers may be a plurality of CPEs. The delay value may be as described previously. For example, the delay value may be $T_{max}$ or $T_{g2}$ or both, variables described previously. In response, in block 1420 a plurality of signals may be received at substantially the same time. The signals may be received within some small tolerance of each other such that they appear from the perspective of the DPU to have effectively arrived at the same time. In other words, any variation in arrival time of the plurality of signals has no detrimental effect on FEXT in the DPU. The method 1400 may optionally contain the step of transmitting an upper bound ($ST_U$) on switching time to the plurality of DSL transceivers.

The plurality of signals may be received at substantially the same time because each of the plurality of DSL transceivers transmitted its corresponding signal at a different time as compared to the other DSL transceivers to account for, e.g., differences in propagation delay and/or switching times. The plurality of DSL transceivers may individualize their transmit times according to, e.g., equations (2)-(4), (9), or (10).

Figure 15:
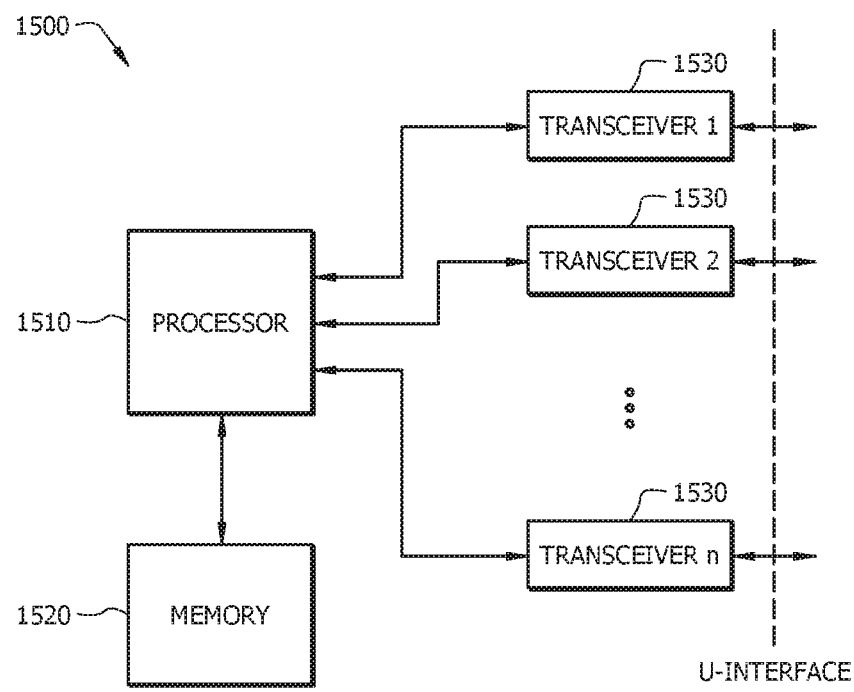
FIG. 15 is a schematic diagram of an embodiment of a DPU.

FIG. 15 is a schematic diagram of an embodiment of a DPU 1500 configured to perform at least one of the schemes described herein. The DPU 1500 comprises a processor 1510, a memory device 1520, and a plurality of transceivers 1530 configured as shown in FIG. 15 (there may be n transceivers, where n is an integer greater than one). A U-interface is illustrated in FIG. 15 as an interface common to the transceivers 1530. The processor 1510 may be implemented as one or more central processing unit (CPU) chips, cores (e.g., a multi-core processor), field-programmable gate arrays (FPGAs), application specific integrated circuits (ASICs), and/or digital signal processors (DSPs). The processor 1510 may be implemented using hardware or a combination of hardware and software.

The memory device 1520 may comprise a cache, random access memory (RAM), read-only memory (ROM), secondary storage, or any combination thereof. Secondary storage typically comprises one or more disk drives or tape drives and is used for non-volatile storage of data and as an over-flow data storage device if RAM is not large enough to hold all working data. Secondary storage may be used to store programs that are loaded into RAM when such programs are selected for execution. ROM may be used to store instructions and perhaps data that are read during program execution. ROM a non-volatile memory device that typically has a small memory capacity relative to the larger memory capacity of secondary storage. RAM may be used to store volatile data and perhaps to store instructions. Access to both ROM and RAM is typically faster than to secondary storage.

The transceivers 1530 may be FTU-Os and may be configured to perform DMT modulation and demodulation. Each of the transceivers 1530 may be coupled to a corresponding CPE via a DSL line. The transceivers 1530 may serve as input and/or output devices of the DPU. For example, if a transceiver 1530 is acting as a transmitter, it may transmit data out of the DPU 1500. If a transceiver 1530 is acting as a receiver, it may receive data into the DPU 1500.

The DPU 1500 may be configured to perform any of the schemes discussed herein, such as the method 1400. For example, the transceivers 1530 may transmit a delay value to a corresponding CPE according to block 1410, as directed by the processor 1510. The transceivers 1530 may thereafter receive a plurality of signals at substantially the same time (e.g., at the U-interface) according to block 1420. The DPU 1500 may implement the FTU-O module 1300. For example, the TCE 1304 may be implemented in the processor 1510 and/or the memory 1520, and the FTU-O transceivers 1302 may correspond to the transceivers 1530.

Note that a CPE may generally have the same configuration as the DPU 1500 except that a CPE may have only one transceiver. That is, a CPE may have a memory, a processor, and a transceiver configured as shown in FIG. 15. The U-interface for a CPE may be a U-R interface.

It is understood that by programming and/or loading executable instructions onto the DPU 1500, at least one of the processor 1510 and the memory 1520 are changed, transforming the DPU 1500 in part into a particular machine or apparatus (e.g., a DPU having the functionality taught by the present disclosure). The executable instructions may be stored on the memory 1520 and loaded into the processor 1510 for execution. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term "about" means+/−10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A method for time-division duplex (TDD) transmission in a digital subscriber line (DSL) communication system comprising a group of DSL transceivers at a remote side (FTU-Rs) and a distribution point unit (DPU), comprising:
   transmitting, by a first FTU-R after receiving downstream symbols in a TDD frame period from a first digital subscriber line (DSL) transceiver at office side (first FTU-O), first upstream symbols in the TDD frame period using a first gap time that corresponds to a longest loop length for the DPU for an initial upstream symbol alignment, wherein the first FTU-R waits the first gap time in the TDD frame period before transmitting the first upstream symbols to the first FTU-O;
   receiving, by the first FTU-R from the first FTU-O, tuning offset information representing a correction for the first gap time; and
   tuning, by the first FTU-R, the first FTU-R's upstream symbols transmit time according to the tuning offset information.

2. The method of claim 1, wherein the first gap time is calculated based on an estimation of loop length.

3. The method of claim 2, wherein the first gap time is estimated by the first FTU-R.

4. The method of claim 3, further comprising:
   receiving, from the first FTU-O, one or more parameters of a longest possible loop-length, propagation delay, or upper bound on switching time;
   applying the one or more parameters to estimate the first gap time.

5. An apparatus for a time-division duplex (TDD) transmission in a digital subscriber line (DSL) transceiver at remote side (FTU-R), comprising:
   a memory storage comprising instructions; and
   one or more processors coupled to the memory storage that execute the instructions to:
   transmit, in response to receiving downstream symbols in a TDD frame period from a digital subscriber line (DSL) transceiver at office side (FTU-O) at a distribution point unit (DPU) comprising a plurality of FTU-Os, first upstream symbols in the TDD frame period using a first gap time that corresponds to a longest loop length for the DPU for an initial upstream alignment, wherein the FTU-R waits the first gap time in the TDD frame period before transmitting the first upstream symbols to the FTU-O;
   receive, from the FTU-O, tuning offset information that represents a correction for the first gap time; and
   tune the FTU-R's upstream symbols transmit time according to the tuning offset information.

6. The apparatus of claim 5, wherein the first gap time is estimated based on an estimation of loop length.

7. The apparatus of claim 6, wherein the one or more processors execute the instructions to estimate the first gap time.

8. The apparatus of claim 7, wherein the one or more processors execute the instructions to:

receive, from the FTU-O, one or more parameters of a longest possible loop-length, propagation delay, or upper bound on switching time;

apply the one or more parameters to estimate the first gap time.

9. A distribution point unit (DPU) comprising:

a plurality of digital subscriber line (DSL) transceivers that support time-division duplex (TDD) transmissions with respective DSL transceivers at remote side (FTU-Rs); and a processor coupled to the DSL transceivers and configured to:

transmit, to a first FTU-R coupled to a first DSL transceiver among the plurality of DSL transceivers, downstream symbols in a first TDD frame period;

receive, from the first FTU-R, upstream symbols in the first TDD frame period, with the upstream symbols and the downstream symbols having an interval of a first gap time for upstream symbol alignment that corresponds to a longest loop for the DPU and represents a waiting time between downstream symbols in the first TDD frame period and the upstream symbols in the first TDD frame period;

estimate a correction for the first gap time to be used by the first FTU-R to tune upstream symbols transmit time in response to reception of the second upstream symbols; and transmit, to the first FTU-R, tuning offset information that represents the correction for the first gap time.

10. The DPU of claim 9, wherein the first gap time is estimated based on an estimation of loop length.

11. The DPU of claim 9, wherein the processor is configured to execute instructions to transmit one or more parameters of a longest possible loop-length, propagation delay, or upper bound on switching time to the first FTU-R to estimate the first gap time.

12. The DPU of claim 9, wherein the processor is configured to execute instructions to transmit the first gap time to the first FTU-R.

13. A method for a time-division duplex (TDD) transmission in a distribution point unit (DPU) comprising a digital subscriber line (DSL) transceiver, comprising:

transmitting, to a DSL transceiver at remote side (FTU-R) coupled to the DSL transceiver, downstream symbols in a first TDD frame period;

receiving, from the FTU-R, upstream symbols in the first TDD frame period, with the upstream symbols and the downstream symbols having an interval of a first gap time for upstream symbol alignment that corresponds to a longest loop for the DPU and represents a waiting time between downstream symbols in a first TDD frame period and the upstream symbols in the first TDD frame period;

estimating a correction for the first gap time to be used by the FTU-R to tune upstream symbols transmit time; and transmitting, to the FTU-R, tuning offset information that represents the correction for the first gap time.

14. The method of claim 13, wherein the first gap time is estimated based on an estimation of loop length.

15. The method of claim 13, further comprising:

transmitting, to the FTU-R, one or more parameters of a longest possible loop-length, propagation delay, or upper bound on switching time to the FTU-R to estimate the first gap time.

16. The method of claim 13, further comprising:

transmitting the first gap time to the FTU-R prior to transmitting the downstream symbols in the first TDD frame period to the FTU-R.

* * * * *